United States Patent
Moreau et al.

(10) Patent No.: US 8,073,115 B2
(45) Date of Patent: Dec. 6, 2011

(54) METHOD AND APPARATUS FOR RECEIVING AND STORING VIDEO SIGNALS

(75) Inventors: André Marcel Moreau, Antwerpenen (BE); Taner Gungor, Wilrijk (BE)

(73) Assignee: Alcatel Lucent, Paris (FR)

( * ) Notice: Subject to any disclaimer, the term of this patent is extended or adjusted under 35 U.S.C. 154(b) by 1406 days.

(21) Appl. No.: 11/565,571

(22) Filed: Nov. 30, 2006

(65) Prior Publication Data

US 2007/0126854 A1    Jun. 7, 2007

(30) Foreign Application Priority Data

Dec. 2, 2005 (EP) .................................... 05292574

(51) Int. Cl.
*H04N 5/445* (2011.01)
*G06F 3/00* (2006.01)
*G06F 13/00* (2006.01)

(52) U.S. Cl. ...... 379/88.13; 725/45; 725/50; 379/93.17; 386/46

(58) Field of Classification Search ................. 725/133, 725/46, 45, 50, 10–14; 709/220; 370/433; 715/716; 379/93.17, 88.13; 386/46
See application file for complete search history.

(56) References Cited

U.S. PATENT DOCUMENTS

| | | |
|---|---|---|
| 2003/0095791 A1 | 5/2003 | Barton et al. |
| 2003/0208763 A1 | 11/2003 | McElhatten et al. |
| 2004/0141713 A1 | 7/2004 | Watkins |
| 2004/0259537 A1 | 12/2004 | Ackley |
| 2005/0160461 A1 | 7/2005 | Baumgartner et al. |
| 2005/0172318 A1* | 8/2005 | Dudkiewicz et al. ............ 725/46 |
| 2005/0183110 A1* | 8/2005 | Anderson ........................ 725/12 |
| 2005/0183120 A1 | 8/2005 | Jain et al. |
| 2006/0253698 A1* | 11/2006 | Mate et al. ..................... 713/151 |
| 2010/0077441 A1* | 3/2010 | Thomas et al. ................ 725/133 |

* cited by examiner

*Primary Examiner* — Fan Tsang
*Assistant Examiner* — Simon King
(74) *Attorney, Agent, or Firm* — Fay Sharpe LLP

(57) ABSTRACT

Detection devices (1) for controlling storage devices (20) for receiving and storing video signals for a plurality of subscribers are provided with memories (2, 3) for storing subscriber's profiles and detectors (4, 5) for detecting video signals comprising content according to the subscriber's profiles. Indication transmitters (6, 7) transmit indications with respect to the video signal to indication receivers (26, 27) of the storage devices (20) for in response to receptions of the indications storing the video signals or to indication receivers (71) of subscriber devices (70) for in response to receptions of the indications informing the subscribers. Switches (8, 9) activate/deactivate the detection devices (1) in response to un-availabilities/availabilities of the subscribers to check the video signal. Report receivers (10, 11) of the detection devices (1) receive reports for reporting un-availabilities/availabilities of the subscribers from report transmitters (81) of telephone systems (80) or from report transmitters (32, 42) of television systems (30, 40).

20 Claims, 2 Drawing Sheets

METHOD AND APPARATUS FOR RECEIVING AND STORING VIDEO SIGNALS

Figure 1:
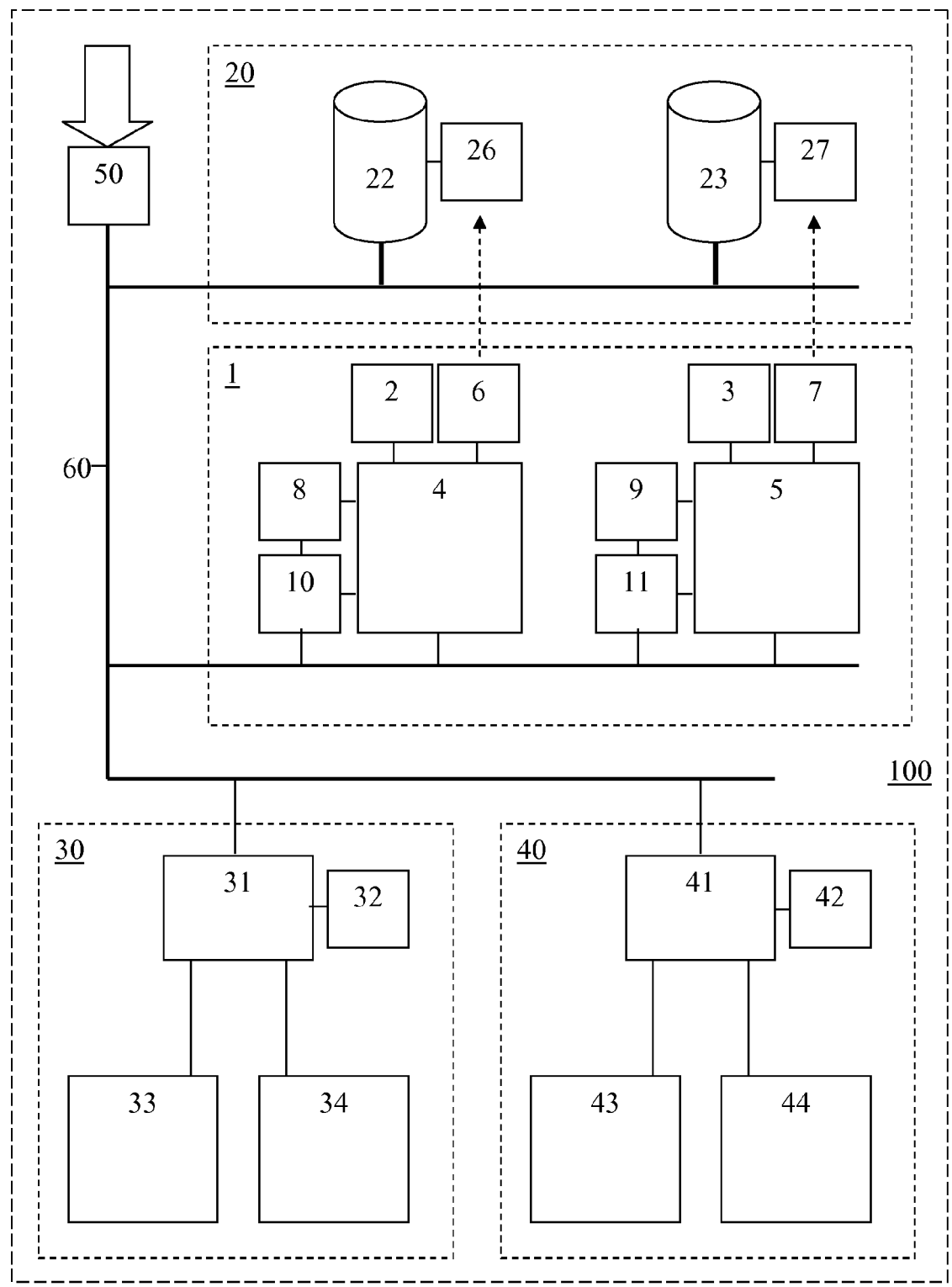

The invention relates to a detection device for controlling a storage device for receiving and storing video signals for a plurality of subscribers.

Examples of such a storage device are network personal video recorders and service provider personal video recorders.

A prior art storage device is known from USApp 2004/0141713 A1, which discloses a service provider personal video recorder employing a remote data storage. A service provider such as an internet service provider maintains storage of content.

The known storage device is disadvantageous, inter alia, owing to the fact that it forms part of a service that is relatively uninteresting to the public.

It is an object of the invention, inter alia, to provide a detection device for controlling a storage device to create a service that is relatively interesting to the public.

The detection device according to the invention is characterized in that the detection device comprises a memory for storing a subscriber's profile and comprises a detector for detecting a video signal comprising a content according to the subscriber's profile.

By introducing the detection device with the memory and with the detector, video signals that are more interesting to the subscriber are automatically detected. As a result, video signals that are more interesting to the subscriber are automatically separated from video signals that are less interesting to the subscriber. The detection device and the storage device form part of a service that will be relatively interesting to the public.

The detection device according to the invention is further advantageous, inter alia, in that it can be used to control the storage device directly as well as indirectly. In other words, alternatively and/or in addition, the detection device controls a service using the storage device and/or controls a service comprising a storage device and/or controls a service for receiving and storing video signals for a plurality of subscribers via a storage device.

It should be noted that USApp 2004/0259537 A1 discloses a cell phone multimedia controller and that USApp 2003/0095791 A1 discloses a system and method for internet access to a personal television service. Both patent applications do not disclose the invention.

An embodiment of the detection device according to the invention is characterized in that the detection device comprises an indication transmitter for transmitting an indication with respect to the video signal to an indication receiver of the storage device for in response to a reception of the indication storing the video signal.

In this case, the detection device controls the storage device directly. The indication receiver may form part of the storage device or may be coupled to the storage device.

An embodiment of the detection device according to the invention is characterized in that the detection device comprises an indication transmitter for transmitting an indication with respect to the video signal to an indication receiver of a subscriber device for in response to a reception of the indication informing the subscriber.

In this case, the detection device controls the storage device indirectly, in other words in this case the detection device supports a control of the storage device and/or the detection device provides information for a control of the storage device. The indication receiver may form part of the subscriber device or may be coupled to the subscriber device. The subscriber device such as a wired or wireless phone or a personal computer etc. may be used to, in response to the reception of the indication, control the storage device directly.

An embodiment of the detection device according to the invention is characterized in that the detection device comprises a switch for a respective activation and deactivation of at least a part of the detection device in response to a respective unavailability and availability of the subscriber to check the video signal.

The respective unavailability and availability of the subscriber to check the video signal are preferably used for the respective activation and deactivation of the memory and/or the detector and/or the indication transmitter and/or another part of the detection device. When the subscriber cannot check offered video signals, the subscriber cannot control the storage device and the detection device may then control the storage device directly or indirectly. When the subscriber can check offered video signals, the subscriber can control the storage device and the detection device may then not control the storage device.

An embodiment of the detection device according to the invention is characterized in that the detection device comprises a report receiver for receiving a report for reporting the respective unavailability and/or availability of the subscriber from a report transmitter of a telephone system.

In this case, the telephone system, such as a wired or wireless telephone system, is used to report the respective unavailability and/or availability of the subscriber to check offered video signals. In case of a wireless telephone system, it can easily be detected that a subscriber has left and has returned to a particular area serviced by a particular base station. In case of a wired telephone system, it can easily be detected that a subscriber has activated and has deactivated a forwarding mode. The report transmitter may form part of the telephone system or may be coupled to the telephone system.

An embodiment of the detection device according to the invention is characterized in that the detection device comprises a report receiver for receiving a report for reporting the respective availability and/or unavailability of the subscriber from a report transmitter of a television system.

In this case, the television system, such as a cable or internet television system, is used to report the respective unavailability and/or availability of the subscriber to check offered video signals. In case of a cable television system, it can easily be detected (via a television receiver or via a set top box or via a cable station etc.) that a subscriber is watching a particular video signal arriving via a particular television channel and that the subscriber is unavailable to check other offered video signals. In case of an internet television system, it can easily be detected (via a personal computer or via a modem or via an access multiplexer etc.) that a subscriber is watching a particular video signal originating from a particular internet site and that the subscriber is unavailable to check other offered video signals. The report transmitter may form part of the television system or may be coupled to the television system.

The invention also relates to a storage and detection system comprising a storage device for receiving and storing video signals for a plurality of subscribers and comprising a detection device according to the invention.

Embodiments of the storage and detection system according to the invention correspond with the embodiments of the detection device according to the invention.

Such a storage and detection system may comprise a subscriber device comprising and/or being coupled to an indication receiver and/or may comprise a telephone system comprising and/or being coupled to a report transmitter and/or may comprise a television system comprising and/or being coupled to a report transmitter.

The invention also relates to a subscriber device for use in the storage and detection system according to the invention and comprising or being arranged to be coupled to the indication receiver.

The invention also relates to a telephone system for use in the storage and detection system according to the invention and comprising or being arranged to be coupled to the report transmitter.

The invention also relates to a television system for use in the storage and detection system according to the invention and comprising or being arranged to be coupled to the report transmitter.

Such a subscriber device and such a telephone system and such a television system may be produced and/or sold and/or set up separately from the storage and detection system.

The invention also relates to a method for controlling a storage device for receiving and storing video signals for a plurality of subscribers.

The method according to the invention is characterized in that the method comprises a first method step of storing a subscriber's profile and comprises a second method step of detecting a video signal comprising a content according to the subscriber's profile.

Embodiments of the method according to the invention correspond with the embodiments of the detection device according to the invention.

The invention also relates to a computer program product for performing the first and second method steps of the method according to the invention.

The invention also relates to a medium comprising the computer program product according to the invention.

The invention is based upon an insight, inter alia, that a known storage device forms part of a service that is relatively uninteresting to the public, and is based upon a basic idea, inter alia, that a video signal comprising a content according to a subscriber's profile is to be detected for a direct control or for an indirect control of a storage device.

The invention solves the problem, inter alia, to provide a detection device for controlling a storage device to create a service that is relatively interesting to the public. The detection device according to the invention is further advantageous, inter alia, in that it can be used to control the storage device directly as well as indirectly.

These and other aspects of the invention will be apparent from and elucidated with reference to the embodiments(s) described hereinafter.

Figure 2:
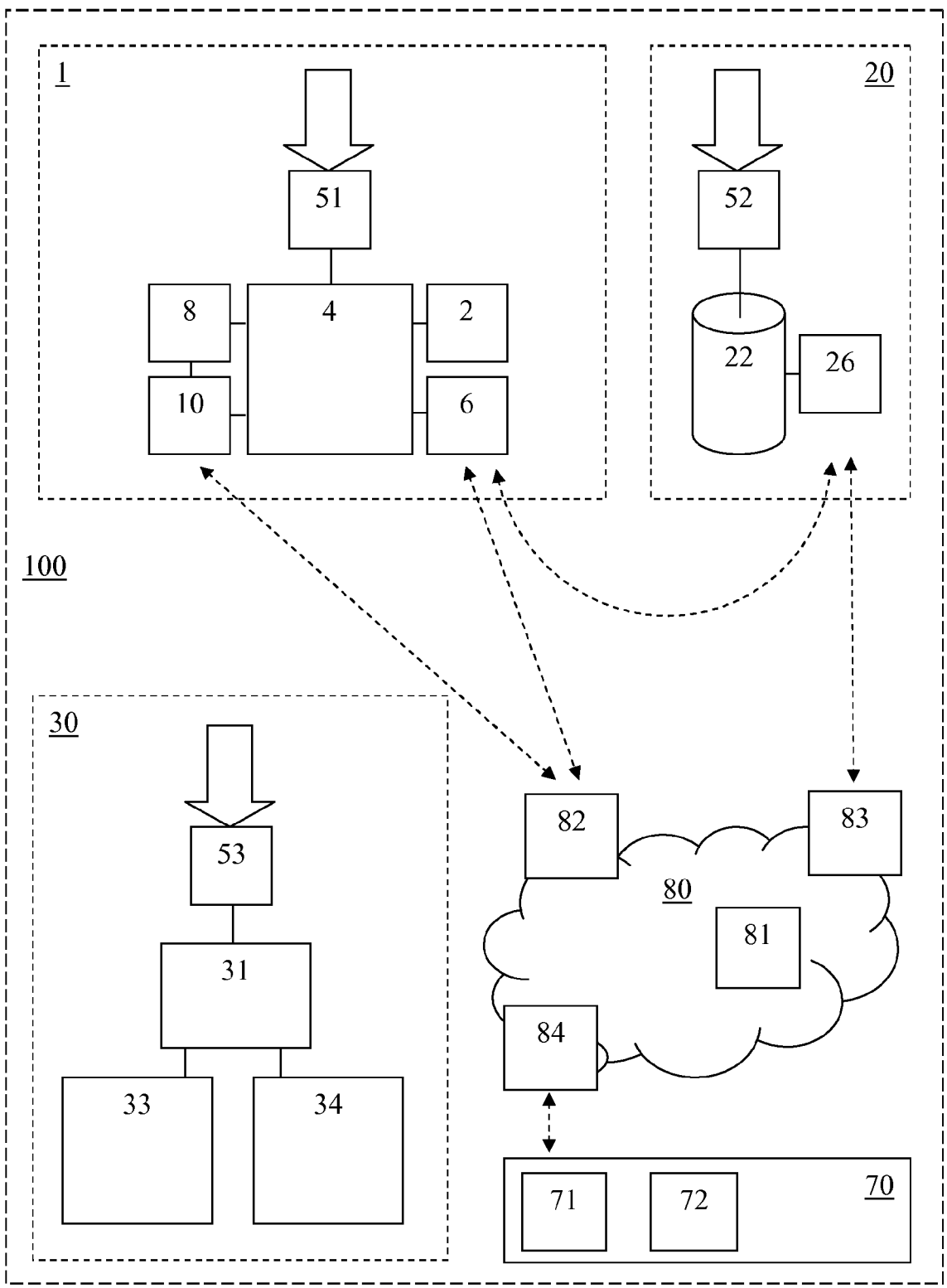

FIG. 1 shows diagrammatically a first storage and detection system according to the invention comprising a storage device for receiving and storing video signals for a plurality of subscribers and comprising a detection device according to the invention, and FIG. 2 shows diagrammatically a second storage and detection system according to the invention comprising a storage device for receiving and storing video signals for a plurality of subscribers and comprising a detection device according to the invention.

The first storage and detection system 100 according to the invention shown in FIG. 1 comprises a detection device 1 according to the invention and comprises a storage device 20 for receiving and storing video signals for a plurality of subscribers and comprises television systems 30, 40 according to the invention. A cable system 60 is coupled to a satellite receiver 50 for receiving video signals and is coupled to the detection device 1 and the storage device 20 and the television systems 30, 40 for supplying the video signals.

The detection device 1 comprises, for a first subscriber owning the television system 30, a memory 2, a detector 4, an indication transmitter 6, a switch 8 and a report receiver 10, and comprises, for a second subscriber owning the television system 40, a memory 3, a detector 5, an indication transmitter 7, a switch 9 and a report receiver 11. The detector 4 (5) is coupled to the cable system 60 and to the memory 2 (3), the detector 4 (5), the indication transmitter 6 (7), the switch 8 (9) and the report receiver 10 (11). The report receiver 10 (11) is also coupled to the cable system 60 and to the switch 8 (9).

The storage device 20 comprises, for the first subscriber, a database 22 coupled to an indication receiver 26, and comprises, for the second subscriber, a database 23 coupled to an indication receiver 27. The television system 30 (40) comprises an interface 31 (41) coupled to the cable system 60 and coupled to a report transmitter 32 (42) and to a television receiver 33 (43) and a player-recorder 34 (44). This interface 31 (41) for example comprises a set top box and/or a decoder etc.

In a prior art situation, the storage device 20 such as for example a service provider personal video recorder employing a remote data storage as for example disclosed in USApp 2004/0141713 A1 is present, and the television systems 30,40 without the report transmitters 32, 42 are present. In this prior art situation, the detection device 1 is not present, and the service offered this way is relatively uninteresting to the public.

According to the invention, the detection device 1 is introduced, to create a service that is relatively interesting to the public. The detection device 1 comprises the memory 2 (3) for storing a first (second) subscriber's profile and comprises the detector 4 (5) for detecting a video signal comprising a content according to the first (second) subscriber's profile. Such a detection device 1 can be used to control the storage device 20 directly as well as indirectly, as explained below.

According to FIG. 1, the detection device 1 comprises an indication transmitter 6 (7) for transmitting an indication with respect to the video signal to the indication receiver 26 (27) of the storage device 20 for in response to a reception of the indication storing the video signal. In this case, the detection device 1 controls the storage device 20 directly. The indication may be exchanged in a wireless way using one or more wireless technologies and/or in a wired way using one or more wired technologies.

The detection device 1 preferably comprises the switch 8 (9) for a respective activation and deactivation of the memory 2 (3) and/or the detector 4 (5) and/or the indication transmitter 6 (7) and/or another part of the detection device 1 in response to a respective unavailability and availability of the first (second) subscriber to check the video signal. When the first (second) subscriber cannot check offered video signals, the first (second) subscriber cannot control the storage device 20 and the detection device 1 may then control the storage device 20 directly or indirectly. When the first (second) subscriber can check offered video signals, the first (second) subscriber can control the storage device 20 and the detection device 1 may then not control the storage device 20.

The detection device 1 preferably comprises a report receiver 10 (11) for receiving a report for reporting the respective unavailability and/or availability of the first (second) subscriber from the report transmitter 32 (42) of the television system 30 (40). Such a report may for example be exchanged via the (two-directional) cable system 60 and may in general be exchanged in a wireless way using one or more wireless technologies and/or in a wired way using one or more wired technologies. In this case, the television system 30 (40) is used to report the respective unavailability and/or availability of the first (second) subscriber to check offered video signals. In case of the television system 30 (40) being a cable television system, it can easily be detected (via a television receiver or via a set top box or via a cable station etc.) that a subscriber is watching a particular video signal arriving via a particular television channel and that the subscriber is unavailable to check other offered video signals. In case of the television system 30 (40) being an internet television system communicating with an internet system not shown and replacing the cable system 60, it can easily be detected (via a personal computer or via a modem or via an access multiplexer etc.) that a subscriber is watching a particular video signal originating from a particular internet site and that the subscriber is unavailable to check other offered video signals.

The second storage and detection system 100 according to the invention shown in FIG. 2 comprises a detection device 1 according to the invention and comprises a storage device 20 for receiving and storing video signals for a plurality of subscribers and comprises a television system 30 and comprises a subscriber device 70 according to the invention and comprises a telephone system 80 according to the invention.

The detection device 1 comprises, for a subscriber owning the television system 30, a memory 2, a detector 4, an indication transmitter 6, a switch 8 and a report receiver 10. The detector 4 is coupled to a satellite receiver 51 for receiving the video signals and to the memory 2, the detector 4, the indication transmitter 6, the switch 8 and the report receiver 10. The report receiver 10 is also coupled to the switch 8.

The storage device 20 comprises, for the subscriber, a database 22 coupled to a satellite receiver 52 for receiving the video signals and coupled to an indication receiver 26. The television system 30 comprises an interface 31 coupled to a satellite receiver 53 for receiving the video signals and coupled to a television receiver 33 and a player-recorder 34. This interface 31 for example comprises a set top box and/or a decoder etc.

The telephone system 80 according to the invention comprises a report transmitter 81 and stations 82-84. The station 82 is for example able to communicate with the indication transmitter 6 and the report receiver 10, the station 83 is for example able to communicate with the indication receiver 26, and the station 84 is for example able to communicate with the subscriber device 70 according to the invention comprising an indication receiver 71 and an indication transmitter 72.

According to FIG. 2, the detection device 1 comprises an indication transmitter 6 for transmitting an indication with respect to the video signal to an indication receiver 71 of a subscriber device 70 for in response to a reception of the indication informing the subscriber. In this case, the detection device 1 controls the storage device 20 indirectly. The subscriber device 70 such as a wired or wireless phone or a personal computer etc. may be used to, in response to the reception of the indication, control the storage device 20 directly, for example by transmitting a further indication from an indication transmitter 72 to the indication receiver 26. The indication and the further indication may be exchanged in a wireless way using one or more wireless technologies and/or in a wired way using one or more wired technologies.

The detection device 1 preferably comprises the switch 8 for a respective activation and deactivation of the memory 2 and/or the detector 4 and/or the indication transmitter 6 and/or another part of the detection device 1 in response to a respective unavailability and availability of the subscriber to check the video signal. When the subscriber cannot check offered video signals, the subscriber cannot control the storage device 20 and the detection device 1 may then control the storage device 20 directly or indirectly. When the subscriber can check offered video signals, the subscriber can control the storage device 20 and the detection device 1 may then not control the storage device 20.

The detection device 1 preferably comprises a report receiver 10 for receiving a report for reporting the respective unavailability and/or availability of the subscriber from a report transmitter 81 of a telephone system 80. Such a report may for example be exchanged via the telephone system 80 and may in general be exchanged in a wireless way using one or more wireless technologies and/or in a wired way using one or more wired technologies. In this case, the telephone system 80, such as a wired and/or wireless telephone system, is used to report the respective unavailability and/or availability of the subscriber to check offered video signals. In case of a wireless telephone system, it can easily be detected that a subscriber has left and has returned to a particular area serviced by a particular base station. In case of a wired telephone system, it can easily be detected that a subscriber has activated and has deactivated a forwarding mode.

In the Figures, the communication from the indication transmitters 6, 7 to the indication receivers 26, 27 and from the report transmitters 32, 42 to the report receivers 10, 11 and from the indication transmitter 6 to the station 82 and from the station 83 to the indication receiver 26 and from the station 82 to the report receiver 10 and between the subscriber device 70 and the station 84 may be a direct wireless communication such as DECT and Bluetooth etc. and may be an indirect wireless communication via a wireless network such as GSM etc. and may be a direct wired communication via one or more wires and one or more fibers etc. and may be an indirect wired communication via a network such as a cable network and an internet network and a telephone network etc. The detection device 1 may form part of the storage device 20 or not. In the detection device 1 and the storage device 20, instead of comprising individual units for individual subscribers, one or more common units for one or more groups of subscribers may be used. The subscriber's profile and/or the detection of a video signal comprising a content according to the subscriber's profile may for example be based on metadata common in the art or on another kind of information common in the art. Each communication may comprise address information and/or identification information and/or non-address information and/or non-identification information. The telephone system 80 with its stations 82-84 may be a wireless system and/or a wired system. Instead of the satellite receivers 50-53, other sources may be used. USApp 2004/0141713 A1 disclosing a service provider personal video recorder employing a remote data storage and USApp 2004/0259537 A1 disclosing a cell phone multimedia controller and USApp 2003/0095791 A1 disclosing a system and method for internet access to a personal television service disclose technologies common in the art that may be used for realizing the invention.

By applying an application that provides location based services, i.e. a service to detect when the subscriber is away from his home (zone), and hence is unable to invoke any recording function as he is away from his set top box, the network is able to offer an innovative service. Through detection that the subscriber is away from his set top box and that there is dynamic content about to be broadcasted that matches his personal preferences (which was not able to be foreseen through normal programming schedules), the subscriber may be notified through for example Instant Messaging. The subscriber is now enabled to choose whether he wants to invoke the network personal video recorder functionality, and can do this through various means such as SMS or HTTP for example from his mobile terminal. This service allows the subscriber to record content he would otherwise have missed, as well as provides a means to recuperate otherwise lost revenue for the service provider.

A scenario may be as follows: The subscriber sets up his preferences via a set top box. The personal service environment links up with content metadata of the video server to be able to trigger upon the subscriber's preferences. The subscriber moves away from his set top box, and this is detected by the location service. The personal service environment is notified that the subscriber is away from home. When dynamic content according to the subscriber's profile is available to be streamed, the personal service environment is notified. The personal service environment notifies the subscriber as to the availability of preferred content. The subscriber opts to record the content. The network personal video recorder is started. Content is streamed and recorded by the network personal video recorder. The subscriber, at a later stage when he is back at home, watches the recorded content.

This solution offers the subscriber the opportunity to record more content, and to thereby generate more revenue for the service providers. It may also be a differentiator for a triple play offer. This solution lets the subscriber record content that is being broadcast at a time when he is not able to normally invoke the recording functionality.

In the Figures, each coupling/connection may be a wired coupling/connection or a wireless coupling/connection. Any unit shown may be divided into sub-units, and any two or more units may be integrated into a new and larger unit. Any unit shown may comprise hardware and/or software. The computer program product according to the invention may be stored on and/or comprise a fixed medium or a removable medium.

The expression "for" in for example "for controlling", "for receiving", "for storing" and "for detecting" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised included as well. The terms "a" and "an" do not exclude a possible presence of one or more pluralities.

The steps and/or functions of "storing" and "detecting" do not exclude further steps and/or functions, like for example, inter alia, the steps and/or functions described for the Figures etc.

The invention claimed is:

1. An apparatus for receiving and storing video signals, comprising:
   a detection device for controlling a storage device, the detection device comprising:
      a memory for storing a subscriber's profile;
      a detector for detecting a video signal comprising a content according to the subscriber's profile;
      an indication transmitter for transmitting an indication with respect to the video signal to an indication receiver of a subscriber device to at least indirectly control receiving and storage of the video signal by the storage device; and
      a switch for a respective activation and deactivation of at least a part of the detection device in response to a respective unavailability and availability of the subscriber to check the video signal based on a report from a report transmitter.

2. The apparatus as defined in claim 1, the detection device further comprising:
   a report receiver for receiving the report from the report transmitter of a telephone system, wherein the report indicates unavailability or availability of a subscriber at the subscriber device via the telephone system.

3. The apparatus as defined in claim 1, the detection device further comprising:
   a report receiver for receiving the report from the report transmitter of a television system, wherein the report indicates unavailability or availability of a subscriber at a television receiver via the television system.

4. The apparatus as defined in claim 1, further comprising the storage device, wherein the storage device is for receiving and storing video signals for a plurality of subscribers in conjunction with the detection device.

5. The apparatus as defined in claim 4, further comprising:
   a telephone system and
   the detection device further comprising:
      a report receiver for receiving the report from the report transmitter of the telephone system, wherein the report indicates unavailability or availability of a subscriber at the subscriber device via the telephone system.

6. The apparatus as defined in claim 5, the detection device being arranged to be coupled to the report transmitter via the telephone system.

7. The apparatus as defined in 4, further comprising:
   a television system and
   the detection device further comprising:
      a report receiver for receiving the report from the report transmitter of the television system, wherein the report indicates unavailability or availability of a subscriber at a television receiver via the television system.

8. The apparatus as defined in claim 7, the detection device being arranged to be coupled to the report transmitter via the television system.

9. The apparatus as defined in claim 1, the detection device being arranged to be coupled to the indication receiver via the subscriber device.

10. A method for receiving and storing video signals, comprising:
   storing a subscriber's profile in a memory of a detection device;
   detecting a video signal comprising a content at a detector of the detection device according to the subscriber's profile;
   transmitting an indication with respect to the video signal to an indication receiver of a subscriber device to at least indirectly control receiving and storage of the video signal by a storage device;
   activating at least a part of the detection device in response to unavailability of the subscriber to check the video signal based on a report from a report transmitter; and
   deactivating at least a part of the detection device in response to availability of the subscriber to check the video signal based on the report from the report transmitter.

11. The method as defined in claim 10, further comprising:
   receiving the report indicating unavailability or availability of a subscriber at the subscriber device via a telephone system.

12. The method as defined in claim 10, further comprising:
   receiving the report indicating unavailability or availability of a subscriber at a television receiver via a television system.

13. The method as defined in claim 10 wherein the storage device is for receiving and storing video signals for a plurality of subscribers in conjunction with the detection device.

14. The method as defined in claim 10 wherein the storage device is for receiving and storing video signals for a plurality of subscribers in conjunction with the detection device, the method further comprising:

receiving the report from the report transmitter of a telephone system at the detection device, wherein the report indicates unavailability or availability of the subscriber to check the video signal.

15. An apparatus for receiving and storing video signals, comprising:

a detection device for controlling a storage device, the detection device comprising:

a memory for storing a subscriber's profile;

a detector for detecting a video signal comprising a content according to the subscriber's profile;

an indication transmitter for transmitting an indication with respect to the video signal to an indication receiver of the storage device to control receiving and storing of the video signal by the storage device; and a switch for a respective activation and deactivation of at least a part of the detection device in response to a respective unavailability and availability of the subscriber to check the video signal based on a report from a report transmitter.

16. The apparatus as defined in claim 15, further comprising the storage device, wherein the storage device is for receiving and storing video signals for a plurality of subscribers in conjunction with the detection device.

17. The apparatus as defined in claim 15, the detection device further comprising:

a report receiver for receiving the report from the report transmitter of a telephone system, wherein the report indicates unavailability or availability of the subscriber to check the video signal.

18. The apparatus as defined in claim 15, the detection device further comprising:

a report receiver for receiving the report from the report transmitter of a television system, wherein the report indicates unavailability or availability of the subscriber to check the video signal.

19. The apparatus as defined in claim 15, further comprising the storage device, wherein the storage device is for receiving and storing video signals for a plurality of subscribers in conjunction with the detection device.

20. The apparatus as defined in claim 19, further comprising:

a telephone system and the detection device further comprising:

a report receiver for receiving the report from the report transmitter of the telephone system, wherein the report indicates unavailability or availability of the subscriber to check the video signal.

\* \* \* \* \*